United States Patent [19]

Waller et al.

[11] Patent Number: 4,622,646
[45] Date of Patent: Nov. 11, 1986

[54] ARRANGEMENTS FOR CORRECTING COMPASSES

[75] Inventors: John C. Waller, Chatswood, Sydney; Gregory C. L. Searle, Croydon, Sydney, both of Australia

[73] Assignee: The Commonwealth of Australia of c/-Department of Defence Support, Australia

[21] Appl. No.: 528,224

[22] Filed: Aug. 31, 1983

[30] Foreign Application Priority Data

Sep. 8, 1982 [AU] Australia .................. PF5804

[51] Int. Cl.⁴ .............. G01C 19/08; G01C 17/38; G06F 15/31
[52] U.S. Cl. ............... 364/571; 33/326; 73/1 E; 364/453
[58] Field of Search ........... 364/450, 453, 460, 571; 33/316, 317 D, 318, 320, 322, 324, 326, 327; 73/178 R

[56] References Cited

U.S. PATENT DOCUMENTS

| 3,254,419 | 6/1966 | Hurlburt | 33/326 |
| 3,555,692 | 1/1971 | Aberle et al. | 33/326 |
| 3,662,764 | 11/1971 | Brendes et al. | 364/453 X |
| 3,849,636 | 11/1974 | Helms | 364/460 |
| 4,114,437 | 9/1978 | Krogmann | 73/178 R |
| 4,262,861 | 4/1981 | Goldstein | 364/453 X |
| 4,321,678 | 3/1982 | Krogmann | 33/320 X |
| 4,347,730 | 9/1982 | Fisher et al. | 364/571 X |
| 4,414,752 | 11/1983 | Derossi | 33/320 |

FOREIGN PATENT DOCUMENTS

1551309 8/1979 United Kingdom ............ 364/460

*Primary Examiner*—Felix D. Gruber
*Attorney, Agent, or Firm*—Silverman, Cass, Singer & Winburn, Ltd.

[57] ABSTRACT

A marine gyro compass output is corrected to take account of accelerations acting upon the ship in which it is installed by calculating about once per second a correction capable of expression by differential equations which are solved by numerical methods by taking small but finite time increments to linearise the equations with regard to time, the current calculated correction factor being applied to correct the gyro compass output many times per second. The corrections can take into account (a) ship north-south acceleration, (b) change in Coriolis acceleration, (c) earth rotation rate and (d) azimuth error for east-west speed. Furthermore, account can be taken of the constant characteristics of the particular gyro compass to be corrected in terms of its tilt limit, its period of damped oscillation, its damping and the characteristics of the compass electrolytic level which determines tilt.

16 Claims, 6 Drawing Figures

ARRANGEMENTS FOR CORRECTING COMPASSES

FIELD OF THE INVENTION

The present invention relates to signal processing apparatus and is more particularly concerned with a method and a means for correcting the output of a marine gyro compass.

BACKGROUND TO THE INVENTION

Large vessels, both military and commercial, are usually fitted with north-seeking gyro compasses which are expensive instruments costing at least some tens of thousands of dollars at 1981 prices. In some vessels, for backup purposes a second gyro compass is installed, this requirement being particularly important in the case of submarines in which considerable accuracy and reliability is required.

One commonly used marine gyro compass is that known as the Sperry Mark 23 Mod L-1 which includes means of providing a North-South speed correction. Nevertheless, the accuracy of this instrument could be improved and for some purposes the accuracy is too low. A typical accuracy would be with an error range of up to $1\frac{1}{2}°$. Other makes of marine gyro compass are available and one of the most accurate of such compasses is accurate to within 0.2° but the cost of such a compass is an order of magnitude larger, the compass including various complicated and expensive means for correcting for accelerations of the ship.

The following patent specifications may be considered to represent the general state of the art:
GB No. 1,551,309 Bodenseewerk Geratetechnik
U.S. Pat. No. 3,849,636 F. Krupp Gmbh
U.S. Pat. No. 4,114,437 Bodenseewerk

SUMMARY OF THE INVENTION

By using at least preferred embodiments of the apparatus according to the present invention, an electrical signal comprising the output of the marine gyro compass such as the Sperry Mark 23 Mod L-1 can be the subject of corrections which greatly increase the accuracy of the signals yet the signal processing apparatus can be of a relatively inexpensive and effective form which can readily be maintained and serviced.

According to a first aspect of the present invention, there is provided a method of correcting the output of a marine gyro compass comprising
applying a first signal representative of the speed of a ship to a signal processor,
applying a second signal to the signal processor representative of the output of a marine gyro compass, and
producing an output signal being a corrected marine gyro compass output, the corrections being corrections capable of expression by virtue of differential equations and which are solved by numerical methods by taking small but finite time increments to linearise the equations with regard to time, the correction factor being updated in this way at regular time intervals.

In a preferred embodiment, the updating of the solution of differential equations is carried out at time intervals of the order of one second, and for this purpose a fast small digital computer is preferably used.

Particularly for use in submarines, a preferred embodiment of the invention has means for providing a corrected compass output at very frequent intervals compared with the time of one second, the last calculated solution to the differential equations being used. For example, the gyro compass output can be corrected 200 times a second and the correction factor recalculated once per second.

Although in a preferred embodiment of the invention correction is made with respect to all the following errors, more broadly an improved device would be provided by simply correcting one or more of the errors. The errors are as follows:

(a) ship north-south acceleration modelled by the equation $$EESD = K (EE + AN/G - EES)$$

(b) change in Coriolis acceleration represented by the expression $$VE.(VE/(RG.cos(LAT)) + 2.\Phi G).sin(LAT).$$

(c) earth rotation rate for east-west speed given by $$\Phi V = \Phi G + VE/(RG.cos(LAT)).$$

(d) azimuth error for east-west speed given by $$VE.tan(LAT)/RG.$$

Preferably the correction according to the invention relies on the solving of differential equations which have been derived from the above mentioned error factors and are as follows:

$$EDD = -PER.EES - EE.\Phi V.cos(LAT) + VE.tan(LAT)/RG \quad (1)$$
$$EED = -DMP.EES + ED.\Phi V.cos(LAT) \quad (2)$$
$$EESD = K(EE + AN/G - EES) \quad (3)$$

In the above expressions and equations the symbols have the following meanings:
AN; ship north acceleration
ED,EDD; azimuth error and error rate
EE,EED; tilt and tilt rate
EES,EESD; tilt signal and tilt signal rate
G; acceleration due to gravity
DMP; damping term of said level detector
LAT; latitude
PER; period term of said level detector
K; Characteristic viscosity of the level detector
$\Phi G$; earth angular rotation speed
$\Phi V$; $\Phi G$ as corrected by east-west speed
RG; earth's radius
VE,VN; ship east and north velocity The three abovementioned differential equations are solved by numerical methods and the result applies a correction ($-ED$) to the output of the gyro compass.

One important application of the invention is to the correction of an output of a Sperry Mark 23 Mod L-1 compass and experiments show that use of the present invention very considerably increases the accuracy of the output.

For use with the Sperry Mark 23 Mod L-1 compass and other similar gyro compasses wherein the output signal comprises synchro analogue signals, use is made of suitable input and outputs with, preferably, analogue to digital converters and a digital processor for correcting the signal.

At least in a preferred embodiment of the invention, it should be possible to achieve an overall correction which limits the rate of erroneous change of a gyro compass (such as the Sperry Mark 23 Mod L-1) to less than 0.1° over a period of about 10 minutes; typically it has been found that this model Sperry gyro compass without additional correction is subjected to a rate of change of 0.1° per minute. The preferred embodiment of the invention takes account of several specific error factors, the expressions for these error factors and the differential equations to be solved to deal with the errors being set out above. These errors will now be explained in more general terms as an aid to understanding the preferred embodiment of the invention.

It is considered that the most significant error, especially with the Sperry Mark 23 Mod L-1 concerns tilt correction. The axis of the compass gyro is set up pointing true north and the compass includes a bubble-type "spirit level" device including an electrolytic solution with means for sensing the bubble position whereby compensation in the compass is introduced for "tilt". When a ship is undergoing acceleration (except in the east-west direction) i.e. when the ship is turning or changing speeds the acceleration forces affect the "bubble" position because the apparent vertical direction within the ship changes. Under the north-south component of the acceleration forces, the gyro compass perceives a tilt and, because it is a gyroscope, the compass adjusts to a revised apparent north-south direction (which is erroneous). In the case of the Sperry Mark 23 Mod L-1, the manufacturers have a limit as to the extent of tilt which can be monitored and this is nominally ten minutes of arc, but in practice the degree of tilt can certainly exceed ten minutes of arc. Furthermore, it has also been found that in practice there are considerable tolerances on manufactured units and the limit of measurable tilt has been found to be anywhere in the range of five minutes to ten minutes of arc.

The approach of the preferred embodiment of the present invention is to designate a tilt signal limit for the signal processor, and to compute the tilt rate and thereby compute the actual tilt so that an appropriate signal correction can be included even though the tilt has gone beyond the tilt signal limit. It is highly advantageous to implement the system whereby the actual tilt signal limit for the particular gyro compass is initially measured and this data is semi- permanently input into a signal processor whereby the data is taken account of in solving the differential equations.

Another relevant factor is that the electrolyte in the "spirit level" has a certain viscosity which will affect the time for the spirit level to respond to a particular acceleration of the ship. A graph of the indicated tilt against time is an assymptotic curve and the tangent of this curve at any point in time represents the rate of change of the bubble position, i.e. the tilt signal rate (EESD), which as stated above is computed but only up to a preset maximum tilt value. The tilt signal rate (EESD) of equation (3) is proportional to the difference between the current tilt signal (EES) and the tilt of the compass with respect to the apparent vertical downward direction. This latter term is derived from the ship north acceleration AN/G plus the true tilt.

The constant "K" in equation (3) relates basically to the viscosity of the fluid in the spirit level, and the value of this expression can now be set utilising measured data to represent the viscosity of the fluid.

In differential equation (1) there is the expression "PER" which concerns the oscillation period as the compass "homes in" and completes a correction; the correction can be expressed in terms of a damped sine wave oscillation and the period of this oscillation is thus taken into account. This expression is latitude independent and is an adjustable electrical factor as is the damping term DMP, both these two terms effectively determining the amount of torque applied for a given tilt signal. The torque is applied to the gyro frame through torque motors. It should be noted that it is preferable to provide for an adjustment for high latitudes by a range switch which has the effect of causing the signal processor to use an alternative stored value for the constant PER.

In accordance with applying the general principles of the invention to the preferred embodiment using the above-mentioned three differential equations, the equations are linearised with regard to time by taking small but finite time increments. The last known values are taken and rates of change calculated and assuming the rates of change are constant over a short period of time, new calculated values are derived. It has been found somewhat surprisingly that in a very economical but nevertheless very effective embodiment, a valuable degree of correction to known gyro compasses, especially for marine use, can be achieved. By contrast other types of marine gyro compasses adopt a different approach to correction and are extremely expensive compared with conventional gyro compasses such as the Sperry Mark 23 Mod L-1.

According to a second aspect of the invention there is provided apparatus for correcting the output of the marine gyro compass comprising
(a) ship speed input means for receiving a signal representative of ship's speed
(b) gyro compass input means for supplying a digital signal corresponding to the compass output to a processing unit
(c) a processing unit for providing an output signal being a corrected gyro compass reading, and
(d) control means for controlling the processor to solve differential equations representative of the corrections to be employed by numerical methods and characterised by taking small but finite time increments for linearising the equations with regard to time, and repeating the computation at regular time intervals.

In a preferred apparatus, the input means comprises input connections for three wire analogue synchro signals from a marine gyro compass, means for converting the signals to digital form of processing, and means for converting a corrected digital output signal to analogue synchro signals to output connections which may use the same format as the input.

Preferably the apparatus comprises a further input for setting the latitude of the ship into the processor by manual input.

Preferably the apparatus uses a fast 16-bit processor such as an INTEL 8088 integrated circuit.

Preferably the processor has timer means for controlling the processor whereby the output signal is corrected with the last calculated correction factor, and the correction factor is calculated at less frequent intervals, e.g. once per second.

Most preferably, the apparatus according to the second aspect of the invention is constructed to operate in accordance with the method of the first aspect of the invention, either in its broadest form or any one of the preferred forms described above.

BRIEF DESCRIPTION OF THE DRAWINGS

The invention will be further explained, by way of example, with reference to the accompanying drawings which comprise.

DETAILED DESCRIPTION OF THE DRAWINGS AND PREFERRED EMBODIMENT

Figure 1:
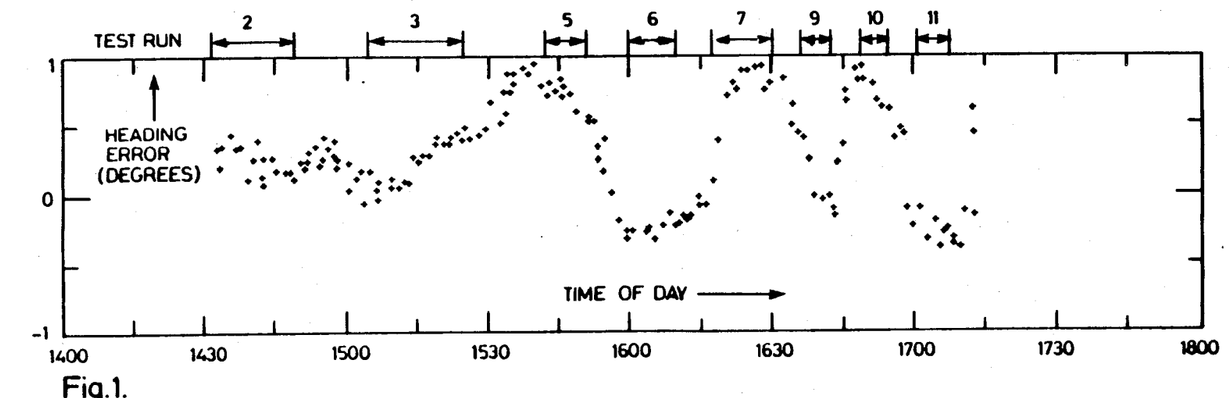
FIG. 1 which is the result of measuring the heading error indicated by a Sperry Mark 23 Mod L-1 compass fitted to a vessel at sea and recorded on a test range when the vessel and manoeuvring in such a way as to cause the errors described above in the method aspect of the invention to occur.
Figure 2:
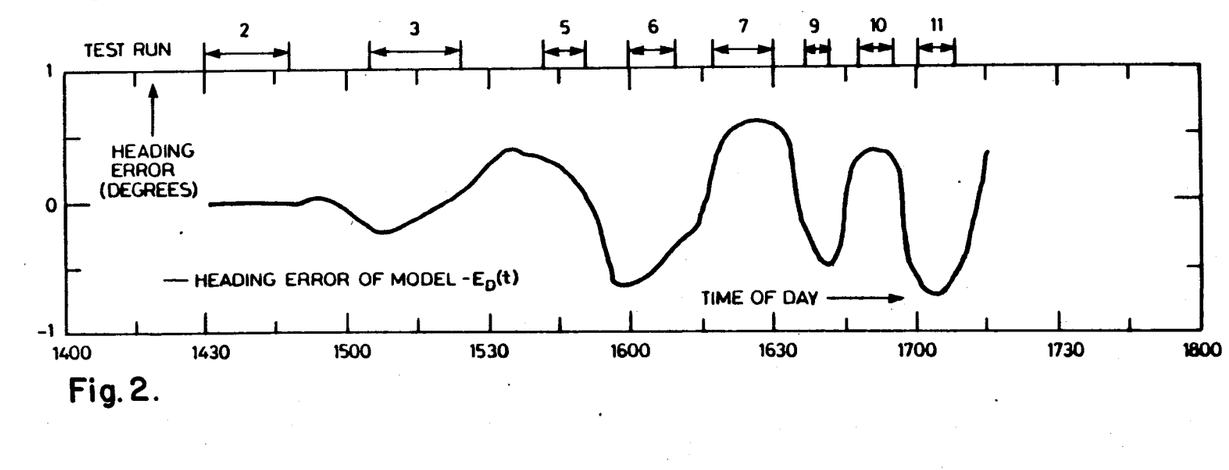
FIG. 2 is a representation of the corresponding heading error as computed using a preferred embodiment of the invention and demonstrating that the present invention can provide a very good solution to the errors discussed above.

The data demonstrated in FIGS. 1 and 2 was derived with a compass which had close to the nominal performance in terms of maximum recordable tilt but it should be noted that unless a compensation is introduced, another similar compass might well have only half the maximum measurable tilt and this can have a dramatic adverse effect on error correction. Thus, to achieve best results the specific performance of each compass must be measured and the necessary parameters set into the signal processor.

In FIG. 1 the horizontal axis represents time of day and the vertical axis the error of heading of the vessel in degrees. A comparison of the actual measured data shown in FIG. 1 and the corrections applied by virtue of use of the present invention and shown in FIG. 2 demonstrates a substantial fit between the measured data and the correction indicated by the present invention in a preferred embodiment.

Figure 3:
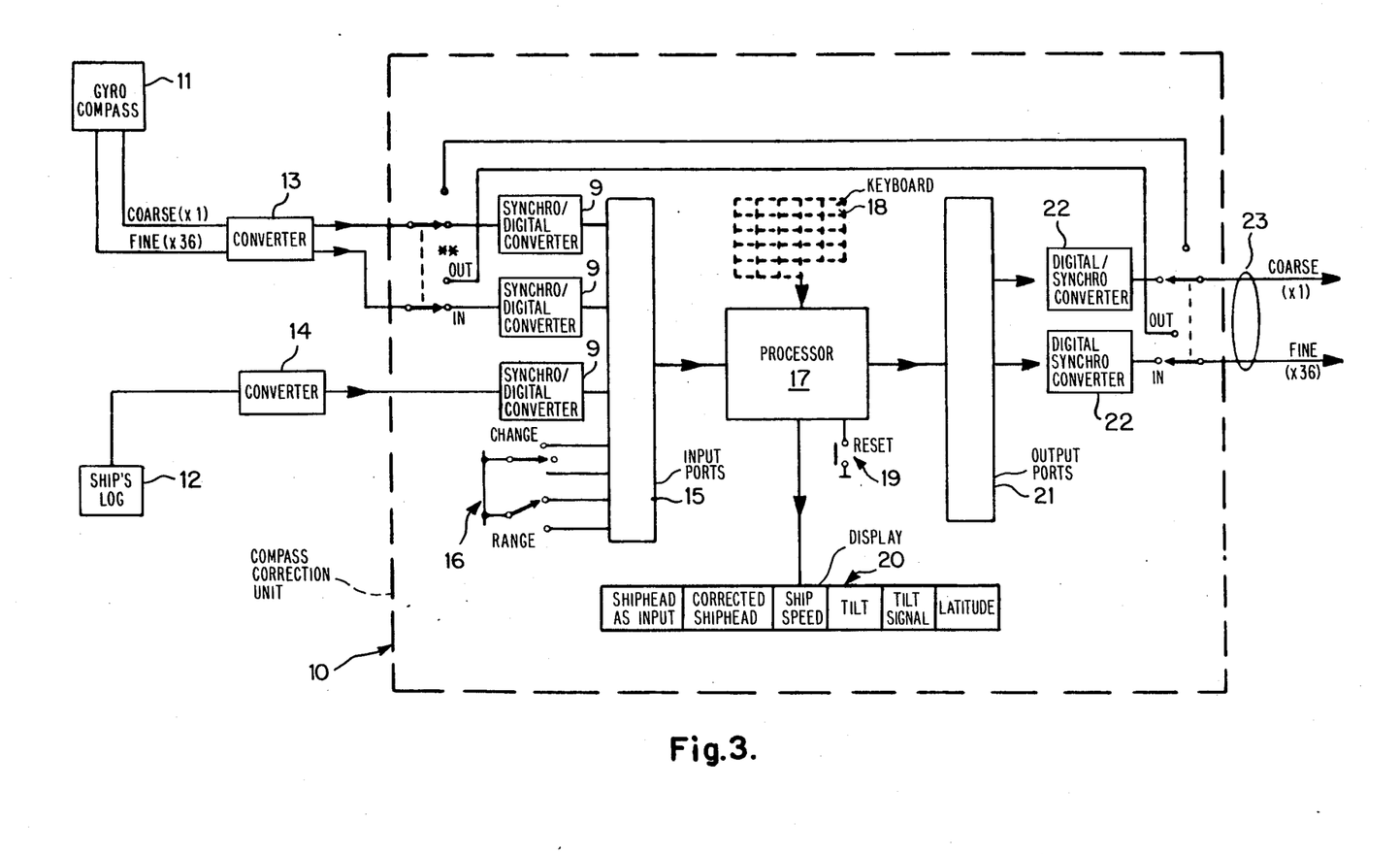
FIG. 3 is a simplified block diagram of apparatus for correcting a marine gyro compass.

Referring now to the simplified block diagram of FIG. 3, the compass correction unit 10 is shown in a dotted line box and is arranged to receive inputs from a gyro compass 11 and a ship's log 12, the outputs of which are converted by respective converters 13 and 14 into 115 volt 400 Hz three wire synchro signals which are fed into the compass correction unit 10. Three wire synchro signals are an electrical analog of a mechanical shaft position, a coarse/fine pair of signals being provided from the compass 11 since additional accuracy is required in respect of this reading. The input from the compass 11 is passed through a changeover switch which can be switched to the "out position" to bypass the compass correction unit if this is required, for example if a fault develops in the unit.

The compass correction unit has a set of input ports 15 which receive the signals respectively from the compass 11 and ship logs 12 after being processed by respective synchro/digital converters (S.D.C.) 9, and in addition the input ports 15 have connections to latitude control switches 16 which respectively permit the correction unit to be set to the nearest degree of latitude by virtue of means for changing the latitude setting, and also the range to be set so that a correction can be applied in circumstances in which high latitudes or low latitudes are experienced by the vessel.

The input ports feed to a processor 17 which is arranged to be connected to a keyboard 18 to be used during setting up and testing of the unit, the processor 17 furthermore having a reset button 19 and an output to a display 20 which permits operation of the unit to be monitored conveniently.

The processor 17 has a further output to a set of output ports 21 which lead to respective digital/synchro converters 22 to provide coarse and fine three wire synchro output signals from the device 23, these outputs being adapted then to be applied to any device requiring the information, the signals being in a conveniently processable and usable form identical to the original compass input.

Figure 4:
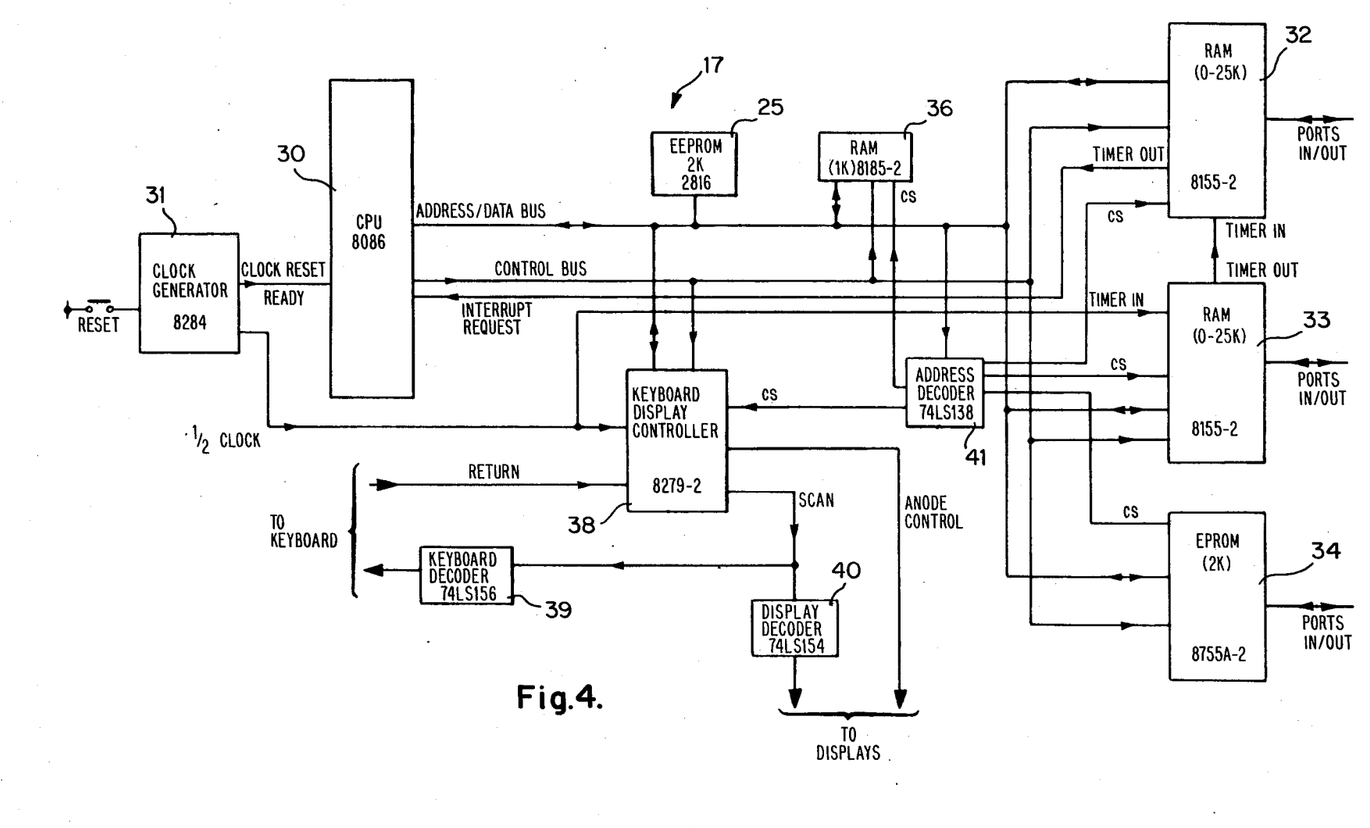
FIG. 4 is a simplified block diagram of a processor for the apparatus of FIG. 3.

FIG. 4 is a simplified block diagram for the processor 17 shown in FIG. 3, the device being constructed around a central processing unit 30 (INTEL 8088) receiving a signal from a clock generator 31 and having connections to an EEPROM 25 for storing the semi-permanent variable and part of the operation program, most of the operating program being stored in the EPROM 34. The random access memory unit (RAM) 36 functions to temporarily store on-line portions of the program obtained from the EEPROM 25 when the CPU 30 is operating.

Random access (read/write) memory programmable timer ports 32 and 33 and the erasable programmable read only memory unit (EPROM) 34 together provide all the input and output ports for the system.

The apparatus also includes a controller 38 for controlling the keyboard and the displays with connections via, respectively, a keyboard decoder 39 and a display decoder 40, the controller 38 furthermore being connected to an address decoder 41 as indicated in the drawing.

In FIG. 4 the connections marked "CS" indicate that the line fulfills a chip select function.

Figure 5:
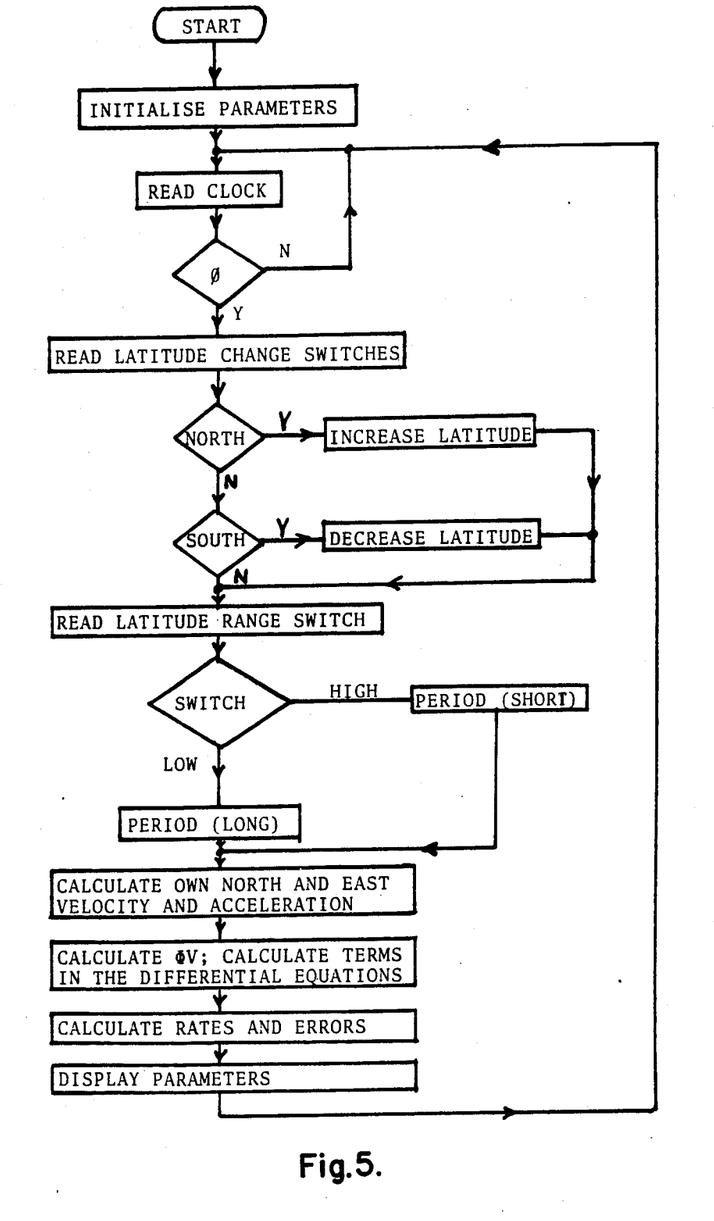
FIG. 5 is a basic flow diagram of the background loop for the processor of FIG. 4.
Figure 6:
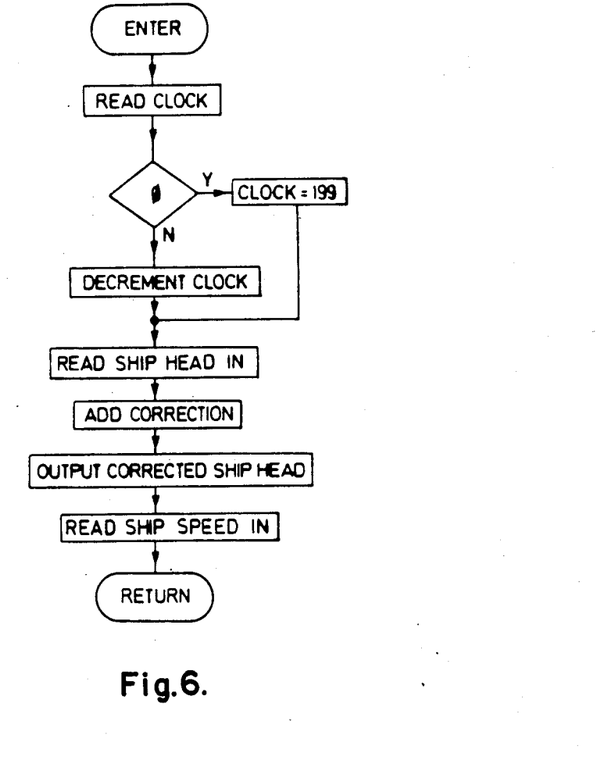
FIG. 6 is a diagram of an interrupt routine for the processor of FIG. 4.

FIG. 5 illustrates a basic flow diagram for the functions effected in the compass correction unit, and FIG. 6 illustrates an interrupt service routine. Interrupt is generated by the programmable timer shown in FIG. 4 200 times per second, and at each interrupt the current correction is applied to the input to genernate the corrected output. Thus, as shown in FIG. 6, the routine comprises a clock reading and if the clock has a zero value the "yes branch" decision is taken and the clock is set to 199 and the logic continues by reading the ship heading into the unit and adding the current stored correction to give a corrected shiphead output. The cycle continues under control of the programmable timer so that 200 cycles per second occur. On the next cycle the clock will read 199 and then the "no decision 38 will be taken, the clock reading will be reduced to 198, the ships heading read in, the current correction applied and again an output of the corrected ship heading given.

The same clock function is used to control the CPU in accordance with FIG. 5 to calculate a new correction once per second. As shown in FIG. 5, if the clock is other than zero, the decision path causes the clock again to be read and this step continues until a zero clock reading occurs. At that stage the "yes decision" path causes the various readings to be input into the CPU and a calculation of the rates and errors occurs and the appropriate parameters are displayed. The loop then goes back to the commencement of the routine again. It will be noted that in accordance with FIG. 6, the calculated and stored rates and errors from FIG. 5 are used for the correction occurring in the routing of FIG. 6, and this routine is ouput for any desired usage.

We claim:

1. A method of correcting the output of a marine gyro compass comprising applying a first signal representative of the speed of a ship to a signal processor, applying a second signal to the signal processor representative of the output of a marine gyro compass, producing an output signal being a corrected marine gyro compass output, the corrections being corrections capable of expression by virtue of differential equations and which are solved by numerical method by taking small but finite time increments to linearize the equations with regard to time, the correction factor being updated in this way at regular time intervals, effecting an initial procedure to feed into a semipermanent data store cooperating with the signal processor values corresponding to a limit of measurable tilt in the gyro compass and said output signal is produced by calculating the rate of change of the tilt up to said limit, the tilt when beyond the limit being also calculated, and storing values corresponding to the following in said initial procedure: the damping characteristic in the gyro compass, the period term for the damped oscillations in the gyro compass following movement to a new position, and a function representative of the viscosity of the fluid in the tilt determining mechanism of the gyro compass.

2. A method as claimed in claim 1, and including updating the solution of the differential equations at time intervals of the order of one second.

3. A method as claimed in claim 1, and wherein a corrected compass output signal is computed a large number of times per second using the last calculated correction factor and a new correction factor is recalculated approximately once per second.

4. A method of correcting the outut of a marine gyro compass having an electrolytic level indicator comprising storing in a signal processor data representative of a limit of measurable tilt in the level indicator, a damping factor (DMP) for the level indicator, a period term (PER) for the level indicator, and a constant (K) being the viscosity characteristic of the electrolytic level indicator, applying a first signal representative of the speed of the ship to the signal processor.

applying a second signal to the signal processor representative of the output of the marine gyro compass, and producing an output signal corresponding to the output of the marine gyro compass corrected by a correction factor by taking into account said input data and first and second signals by solving the following differential equations by numerical methods;

$$EDD = -PER.EES - EE.\Phi V.\cos(LAT) + VE.\tan(LAT)/RG$$

$$EED = -DMP.EES + ED.\Phi V.\cos(LAT)$$

$$EESD = K(EE + AN/G - EES)$$

the solving of the equations being effected by taking small but finite time increments to linearize the equations with regard to time, the correction factor used to produce the corrected output signal being updated at regular time intervals, in the above equations the following notation being used:

AN; ship north acceleration
ED,EDD; azimuth error and error rate
EE,EED; tilt and tilt rate
EES,EESD; tilt signal and tilt signal rate
G; acceleration due to gravity
DMP; damping term of the level detector
PER; period term of the level detector
K; characteristic viscosity of the compass level detector
LAT; latitude
$\Phi G$; earth angular rotation speed
$\Phi V$; $\Phi G$ as corrected by east-west speed
RG; earth's radius
VE,VN; ship east and north velocity.

5. A method of correcting the output of a marine gyro compass having a level detector in respect of which the damping factor (DMP), period term (PER) and constant value (K) dependent on the viscosity characteristic of the fluid in the level detector are known comprising/applying a first signal representative the speed of a ship to a signal processor, applying a second signal to the signal processor representative of the output of the marine gyro compass, and providing stored values in said signal processor corresponding to DMP, PER and K producing an output signal being a corrected marine gyro compass output, the corrections taking into account errors represented by the following:

(a) ship north-south acceleration modelled by the equation $$EESD = K(EE + AN/G - EES)$$

(b) change in Coriolis acceleration represented by the expression $$VE.(VE/(RG.\cos(LAT)) + 2.\Phi G).\sin(LAT).$$

(c) earth rotation rate for east-west speed given by $$\Phi V = \Phi G + VE/(RG.\cos(LAT)), \text{ and}$$

(d) azimuth error for east-west speed given by $$VE.\tan(LAT)/RG,$$

wherein in the above expressions and equations the symbols have the following meanings:

AN; ship north acceleration
ED,EDD; azimuth error and error rate
EE,EED; tilt and tilt rate
EES,EESD; tilt signal and tilt signal rate
G; acceleration due to gravity
DMP; damping term of the level detector
PER; period term of the level detector
K; characteristic viscosity of the compass level detector
LAT; latitude
$\Phi G$; earth angular rotation speed
$\Phi V$; as corrected by east-west speed
RG; earth's radius
VE,VN; ship east and north velocity and wherein the corrections are capable of expression by the following differential equations;

$$EDD = -PER.EES - EE.\Phi V.\cos(LAT) + VE.\tan(LAT)/RG$$

$$EED = -DMP.EES + ED.\Phi V.\cos(LAT)$$

$$EESD = K(EE + AN/G - EES)$$

the differential equations being solved by numerical methods by taking small but finite time increments to linearize the equations with regard to time, the correction factor being updated in this way at regular time intervals.

6. A method as claimed in claim 5, and including taking the output signal of a marine gyro compass in the form of synchro analogue signals, converting the signals into digital form thereby providing said second signal which is corrected in accordance with the method in a digital processor.

7. A method as claimed in claim 5, and including determining a correction factor by solving the differential equations at points in time separated by about one second and correcting the compass output signal about 200 times per second using the last known correction factor.

8. Apparatus for correcting the output of the marine gyro compass having a level detector comprising
   (a) ship speed input means for receiving a signal representative of ship's speed
   (b) gyro compass input means for supplying a digital signal corresponding to the compass output to a processing unit
   (c) a processing unit responsive to the ship speed and gyro compass input means for providing an output signal being a corrected gyro compass reading, and
   (d) control means for controlling the processing unit to solve differential equations representative of the corrections to be employed by numerical methods and characterised by taking small but finite time increments for linearizing the equations with regard to time, and repeating the computation at regular time intervals.

9. Apparatus as claimed in claim 8, and wherein said input means comprises input connections for three wire analogue synchro signals from a marine gyro compass, means for converting the synchro signals to digital form for processing, and means for converting a corrected digital output signal to analogue synchro signals which are supplied to output connections.

10. Apparatus as claimed in claim 8, and comprising a further input for setting the latitude of the ship into the processing unit by manual input.

11. Apparatus as claimed in claim 8, and wherein said processing unit has timer means for controlling the processing unit whereby the output signal is corrected with the last calculated correction factor, and the correction factor is calculated at less frequent intervals.

12. Apparatus as claimed in claim 11, wherein the output signal is corrected several hundred times per second and the correction factor to be applied at each correction is calculated at the order of once per second.

13. Apparatus as claimed in claim 8, wherein said control means includes means for operating the processing unit to take account of the following errors represented as follows:

(a) ship north-south acceleration modelled by the equation $$EESD = K(EE + AN/G - EES)$$

(b) change in Coriolis acceleration represented by the expression $$VE.(VE/(RG.\cos(LAT)) + 2.\Phi G).\sin(LAT).$$

(c) earth rotation rate for east-west speed given by $$\Phi V = \Phi G + VE/(RG.\cos(LAT)), \text{ and}$$

(d) azimuth error for east-west speed given by $$VE.\tan(LAT)/RG,$$

wherein in the above expresssions and equations the symbols have the following meanings:
AN; ship north acceleration
ED,EDD; azimuth error and error rate
EE,EED; tilt and tilt rate
EES,EESD; tilt signal and tilt signal rate
G; acceleration due to gravity
DMP; damping term of the level detector
PER; period term of said level detector
K; characteristic viscosity of the level detector
LAT; latitude
$\Phi G$; earth angular rotation speed
$\Phi V$; $\Phi G$ as corrected by east-west speed
RG; earth's radius
VE,VN; ship east and north velocity and solving differential equations in the following form:

$$EDD = -PER.EES - EE.\Phi V.\cos(LAT) + VE.\tan(LAT)/RG$$

$$EED = -DMP.EES + ED.\Phi V.\cos(LAT)$$

$$EESD = K(EE + AN/G - EES).$$

14. Apparatus as claimed in claim 8, and wherein said processing unit comprises
   (a) means providing input and output ports including programmable timer ports and an erasable programmable read only memory for receiving the signals from the ships speed input means and the gyro compass input means, and for providing said output signal,
   (b) means for storing values representative of characteristics of the level detector of the gyro compass in terms of
      (i) limit of measurable tilt in the gyro compass;
      (ii) the damping characteristic in the gyro compass;
      (iii) the period term for the damped oscillations in the level detector following movement to a new position; and
      (iv) a function representative of the viscosity of the fluid in the level detector,
   (c) a central processing unit,
   (d) means storing a program for controlling the central processing unit characterized by means for correcting for the errors represented as follows:
      (a) ship north-south acceleration modelled by the equation $$EESD = K(EE + AN/G - EES)$$

(b) change in Coriolis acceleration represented by the expression

VE.(VE/(RG.cos(LAT))+2.ΦG).sin(LAT).

(c) earth rotation rate for each-west speed given by $\Phi V = \Phi G + VE/(RG.\cos(LAT))$, and (d) azimuth error for east-west speed given by VE.tan(LAT)/RG, wherein in the above expressions and equations the symbols have the following meanings:
  AN; ship north acceleration
  ED,EDD; azimuth error and error rate
  EE,EED; tilt and tilt rate
  EES,EESD; tilt signal and tilt signal rate
  G; acceleration due to gravity
  DMP; damping term of the level detector
  PER; period term of the level detector
  K; characteristic viscosity of the level detector
  LAT; latitude
  ΦG; earth angular rotation speed
  ΦV; ΦG as corrected by east-west speed
  RG; earth's radius
  VE,VN; ship east and north velocity and for solving the differential equations as follows:

$EDD = -PER.EES - EE.\Phi V.\cos(LAT) + VE.\tan(LAT)/RG$ $EED = -DMP.EES + ED.\Phi V.\cos(LAT)$ $EESD = K(EE + AN/G - EES)$.

15. Apparatus as claimed in claim 14, and including a clock generator connected to control the processing unit and control means, the control means further being characterised by means for causing calculation approximately once per second the required correction factor for the gyro compass, and means for correcting the output of the gyro compass approximately 200 times per second using the last calculated correction factor.

16. Apparatus as claimed in claim 8, further including means for effecting in initial procedure to feed into a semi-permanent data store cooperating with the processing unit values corresponding to a limit of measurable tilt in the gyro compass and means for producing said output signal by calculating the rate of change of the tilt up to said limit, the tilt when beyond the limit being also calculated and means for storing values corresponding to the following in said initial procedure: the damping characteristic in the gyro compass; the period term for the damped oscillations in the gyro compass following movement to a new position; and a function representative of the viscosity of the fluid in the tilt determining mechanism of the gyro compass.

* * * * *